United States Patent [19]

Probst

[11] 4,308,944
[45] Jan. 5, 1982

[54] LOW-NOISE SPEED REDUCTION FOR A ONE-TRACK BOTTLE FLOW, ESPECIALLY FOR BOTTLING PLANTS

[75] Inventor: Wolfgang Probst, Hohenbrunn, Fed. Rep. of Germany

[73] Assignee: Seitz-Werke GmbH, Bad Kreuznach, Fed. Rep. of Germany; a part interest

[21] Appl. No.: 165,354

[22] Filed: Jul. 2, 1980

Related U.S. Application Data

[63] Continuation of Ser. No. 915,756, Jun. 15, 1978, abandoned.

[30] Foreign Application Priority Data

Jun. 16, 1977 [DE]  Fed. Rep. of Germany ....... 2727278

[51] Int. Cl.³ .............................................. B65G 47/31
[52] U.S. Cl. .................................... 198/442; 198/462
[58] Field of Search ............... 198/436, 437, 442, 445, 198/448, 452, 453, 454, 455, 462

[56] References Cited

U.S. PATENT DOCUMENTS 2,980,229  4/1961  Carter ................................. 198/442
3,279,580  10/1966  Englander et al. ............. 198/462 X
3,552,537  1/1971  Vamvakas ........................... 198/442

Primary Examiner—Jeffrey V. Nase

Attorney, Agent, or Firm—Becker & Becker, Inc.

[57] ABSTRACT

An arrangement for a low-noise speed reduction of a one-track bottle flow in a bottle distributing station, especially in bottling plants, according to which a flow of bottles arranged in spaced relationship to each other in conformity with a desired bottle spacing is supported by and transferred by way of a guiding rail or guiding wall from the first moving conveyor section onto a second moving conveyor section adjacent and substantially parallel to the first conveyor section. The bottle flow or advancing speed of the bottles on the second conveyor section where it forms a closed-up bottle flow corresponds to the speed $v_2$ or slightly higher speed of the closed-up bottle flow on the second conveyor section. Subsequently, the now closed-up bottle flow is transferred by a following guiding rail or wall onto one or more leading-off conveyor sections the speed of which is considerably reduced over that of the last mentioned closed-up bottle flow. The guiding rail or wall effecting a bottle transfer onto a slower conveyor section defines with the direction of movement of the pertaining conveyor section a relatively great angle $\phi$ and is so designed as to release the bottle flow directly after transferring a bottle flow onto the last mentioned slower conveyor section.

3 Claims, 1 Drawing Figure

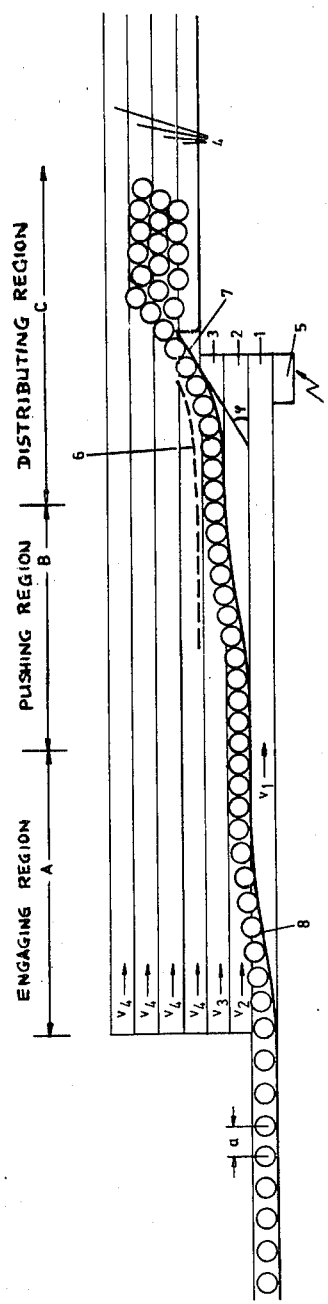

LOW-NOISE SPEED REDUCTION FOR A ONE-TRACK BOTTLE FLOW, ESPECIALLY FOR BOTTLING PLANTS

This application is a continuation-in-part of Ser. No. 915,756, filed June 15, 1978, and now abandoned.

The present invention relates to a low-noise reduction of the speed of a one-track bottle flow, for instance for use in bottling plants, according to which the one-track bottle flow is to be widened to a wider flow, while generally a bottle flow with division bottle flow moving on a conveyor is transferred to an adjacent conveyor section which is substantially parallel to said first mentioned conveyor section. This transfer is effected by guiding walls or rails. The flow speed corresponds to the closed bottle flow, while the now closed bottle flow is by means of the flow guiding wall between the direction of the conveyor movement and the guiding wall transferred to one or more leading-off conveyor sections, the speed of which is considerably reduced relative to the closed bottle flow. Such reduction in the speed is particularly to the outlet of one-track machines required in bottling plants because only at a low speed, the further transport and the required redistribution of the bottle flow with lower noise emission can be realized.

For meeting these requirements, it is known to reduce the speed of the bottle flow which leaves the bottling machine and in which the bottles have in most instances a distance from each other caused by the type of machine, and to effect this reduction with a corresponding fine step reduction, the noise level will be reduced all the more the longer braking range has been designed, by transferring the bottle flow to an ever slower section of the conveyor.

It is further known by laterally offsetting the guiding walls to facilitate the distribution of the bottles to both sides and thereby likewise somewhat to reduce the noise level.

It is also known by mechanical interspersing of the one-track bottle flow onto a conveyor reduced in speed, to brake the bottle row with a lower noise development. These known and actually practiced methods require rather long transporting paths for braking the bottle flow. Therefore, in view of the required ground surface they are rather expensive. Furthermore, the transverse distribution of the bottles is effected during the braking through the push of the still faster one-track row so that due to these high pushing forces, during the braking out of individual bottles, relatively high pulse noise levels occur when closing the thus created gaps.

Furthermore, when closing up the spaced bottles leaving the machine, still considerable noise is developed. This so-called division impact generally causes an intermediate noise level which depends directly on the difference between the speeds ahead of and after the impact area, and thus reaches high values directly in particular with high through-puts and relatively wide bottle distances at the machine outlet.

Also, the heretofore known arrangement according to which the continuing guiding wall is set back for a simplified distribution of both sides does not solve the problem of noise intensifying division impact and still requires too high pushing forces for a transverse division of the bottles. The mechanical movement of the deviating guiding wall while reducing said required pushing force still does not permit a reduction of the acceptable noise level when the bottles pass through the outlet at relatively great distance and with a high output.

It is, therefore, an object of the present invention to overcome the above mentioned drawbacks and to brake a bottle flow, of the above mentioned type, i.e. a bottle flow with spaced bottles—in other words an open bottle flow—passed along a path, over short distances and with a low noise level to such an extent that the bottle flow will continue at a low speed while the bottle flow is transformed into a wider bottle flow.

These and other objects and advantages of the invention will appear more clearly from the following specification in connection with the accompanying drawing diagrammatically showing an embodiment according to the invention of a low noise speed reducing system for a bottle flow distributing station in bottling plants. The arrangement according to the invention for a low noise speed reducing system for a bottle flow distribution station in bottling plants is characterized primarily in that the wall means leading to the conveyor sections of lower speed with the direction of movement of the conveyor sections defines a relatively large angle $\phi$ and is so designed that it releases the bottle flow directly after the latter has been transferred to the respective adjacent lower transport section in view of the stepped speed reduction of the conveyor sections which will now be described and the furthermore described shape of the guiding wall in the first conveyor section, a lower and thus low noise closing up of the bottle flow with the spaced bottles toward the bottle flow with bottles following closely to each other will be realized, and in the second section a low noise distribution of the dense one-track flow to the wider bottle flow with considerably reduced speed will be made possible.

In view of the uncoupling according to the invention of these sections with a conveyor intermediate section correspondingly set according to its speed or controlled, the noise-low bottle distribution becomes independent of the respective lubricating and thus frictional conditions.

IN THE DRAWING

The view of the drawing is a diagrammatic illustration of a low-noise speed-reducing system for a bottle-flow distributing station in bottling plant having features in accordance with the present invention.

Referring now to the drawing in detail, the low noise engagement of the bottles which are spaced from each other to form a closed up flow is effected by transferring the flow from one conveyor section 1 at the speed $v_1$ corresponding to the flow of bottles divided by the distance a, to a parallel conveyor section 2 at a speed $v_2$ corresponding to that of the closed bottle flow or with a speed which only slightly differs in upward direction from said speed $v_2$, with a throughput of 50,000 Eurobottles per hour and with a distance "a" equalling 0.1 meter, the speed $v_2$ amounts to about 1.4 meter per second. The bottle row which on the section A forms in the form of a closed up bottle row is now transferred to a conveyor section 3 moving at the speed of $v_3$. This speed is again higher than the speed of the close one-track bottle row $v_2$ whereby the required push to the next following distribution will be generated without the formation of an accumulation and thus without increasing the noise level during the closing up of the bottle row in the first section of the distribution (distribution impact). The push generating speed difference $v_3 - v_2$ must be all the greater the lower the desired end speed $v_4$ is supposed to be on the withdrawal transport and the wider the bottle flow to be transported off is intended. The conveyor sections 1, 2 and 3 with a drive 5 thereof are diagrammatically in the drawing.

The one-track bottle flow is from said push generating transport section at a relatively great deviating angle $\phi$ of the wall 7 transferred at an angle to the off moving conveyor section 4 with the desired end speed $v_4$. This guiding wall 7 advantageously projects somewhat into the region of the lower conveyor section (from 0 to 20 cm) and then ends or is returned relative to the bottle flow moving into said section. The entrance angle $\phi$ of the transferring guiding wall section must be relatively great (between 25° and 40°). In view of this great angle, the bottles are pressed against the wall by the push creating transporting chains or from the transporting belt, and in spite of the pushing forces in the one-track bottle row, a braking out of individual bottles will not occur. The braking out may also be prevented by a counter wall or rail 6 within the pushing region.

The one-track bottle row now moves onto the lower withdrawal conveyor 4 at the angle $\phi$. Inasmuch as the withdrawal conveyor chains or belts bring about a deviation of the bottles from the pushing direction of the subsequent bottles, a continuous bending off of the row is brought about for rolling off the front braked bottles on the following pushing still fast moving bottles, whereby a broadening and braking of the bottle flow is considered.

Inasmuch as the front bottles by rolling off are moved out of the one-track bottle path, the reduction of the kinematic energy is not effected by the noise intensive shock of bottle against bottle but is effected through the friction of the bottles on the transport chains or belts pushed onto the slow conveyor.

The drawing shows an example as it has been used in practice, with hinge band chain-conveyors. The bottles which are fed while being spaced from each other by the distance "a" will with a throughput of F (bottles per second) require a speed of the feeding chain of $v_1 = F \times a$ m/s.

The bottles are now transferred by the deviating wall or rail 8 to the second chain at a speed of the closed one-track row namely at a speed $v_2 = F \times d$, in which d indicates the bottle diameter measured in meters. The speed of the chain 2 may also slightly deviate from this speed $v_2$ ($\pm 5\%$).

The closed bottle row is now conveyed via the accelerating pushing chain 3 to the distributing pushing edge. If the closed bottle row is guided over a sufficient length of chain 2, and if the speed of chain 2 is selected somewhat greater than $v_2$, it is possible with a slight increase in the noise level at the division impact when transferring from the conveyor section 1 to conveyor section 2 to do without the pushing chain 3. The speed $v_3$ of the pushing chain 3 is higher, but at least equal to the speed $v_2$. The wall or rail 7 now guides the bottle row at an angle $\phi$ of about 30° on the withdrawing conveyor and is then moved back for the continuous transfer onto the further guiding wall or rail. The withdrawing speed, with the described embodiment amounts to 40% of the feeding conveying speed, while the noise level in spite of constant through-put is reduced over the customary conventional construction of the same length by about 10 dB(A).

The three above described essential portions of the bottle distribution according to the invention may also each be designed of a plurality of transporting chains.

According to a further development of the invention, for purposes of uncoupling the region in which the divided bottle row closes up to a dense bottle row is controlled or regulated by the distribution range C, the speed of the pushing chains 3, or the transfer angle of the walls or rails until a light barrier at the transfer 1–2 registers the spacing between the bottles of the bottle row, and a light barrier ahead of the transfer 2–3 to the pushing region registers the closed-up bottle row. If the bottles accumulate at the transfer from path 1 to path 2 to such an extent that they push back, so that the noise level at the space division impact increases, the speed of the pushing chains will be increased for a relief of the situation, in other words the transfer angle will be reduced. If the bottles are drawn off too fast, the noise intensive division impact in the fast pushing range occurs so that a noise intensive division impact occurs in the fast pushing range, the speed of the pushing chains is reduced or in other words the transfer angle is increased.

With variable input speed $v_1$, the speeds of the remaining ranges of the bottle distribution, but at least within the sections 2 and 3 will be controlled proportionally with regard to $v_1$.

Also included with the bottle distribution station are means for controlling set additional conveyor station in conformity with the location of the spot where the bottles close up to form a dense row. Furthermore, the bottle distributing station includes means for controlling the magnitude of the relatively large angle in conformity with the location of the spot where the bottles close up to form a dense row. The bottle distributing station also includes two sensors spaced from each other and associated with a conveyor section the speed of which at least approximately equals the speed of a closed-up bottle flow preceding the additional conveyors section, the first sensor being operatively connected with the bottle flow of spaced bottles for registering the same, and the second sensor being operatively connected with a closed-up flow of bottles for registering same.

It is, of course, to be understood that the present invention is by no means limited to the specific showing in the drawing, but also comprises any modifications within the scope of the appended claims.

What I claim is:

1. A bottle distributing station for a low-noise speed reduction of a single-track bottle flow over a smooth and even transporting surface to plural rows of bottles for delivery at a slower speed, especially for bottling plants, which includes in combination: movable conveyor means comprising a first conveyor section for receiving and conveying a first single row of bottles at a first speed in an open flow of bottles arranged in predetermined spaced relationship to each other, said conveyor means also comprising a second conveyor section operable to receive said first single row of bottles in a single track along the open flow of bottles from said first conveyor section and to advance bottles in said single track along the open flow of bottles at a second speed reduced with respect to the first speed resulting in that for attaining closed-up flow of bottles with low noise when open flow of bottles is changed to closed-up flow of bottles, a third conveyor section following said second conveyor section to receive the closed-up flow of bottles in a second single row accellerated and increased with respect to the second speed thereby to provide a speed above that of said second conveyor section, at least one substantially wider withdrawing conveyor section following said third conveyor section for receiving a plurality of rows of bottles, from said second single row, and rail means for guiding the first single row of bottles from the first conveyor section onto the second conveyor section, the third conveyor section and the withdrawing conveyor section in succession, said rail means including a rail segment for guiding the closed-up flow of bottles in said second single row onto said at least one withdrawing conveyor section, said at least one withdrawing conveyor section being operable at a differing speed considerably reduced over that of said first mentioned closed-up flow of bottles, so that said plural rows of bottles are delivered at a slower speed than said second row, said rail segment defining with the direction of movement of said at least one withdrawing conveyor section such a relatively great angle as to direct the bottle flow from said second single row across said wider conveyor section to form plural rows of said bottles on said withdrawing conveyor section, said third conveyor section being interposed directly between said second conveyor section and said at least one withdrawing conveyor section, said third conveyor section being operable at higher speed than the preceding second conveyor section and providing additional pushing force to form said plural rows of bottles on said withdrawing conveyor section.

2. A bottle distributing station according to claim 1, in which said relatively great angle is within the range of from 25° to 40°.

3. A bottle distributing station according to claim 1, in which said relatively great angle is within the range of from 30° to 35°.

* * * * *